May 27, 1947.  E. E. LAKSO ET AL  2,421,102
REPAIR OF TIRES
Filed Nov. 9, 1944  2 Sheets-Sheet 1
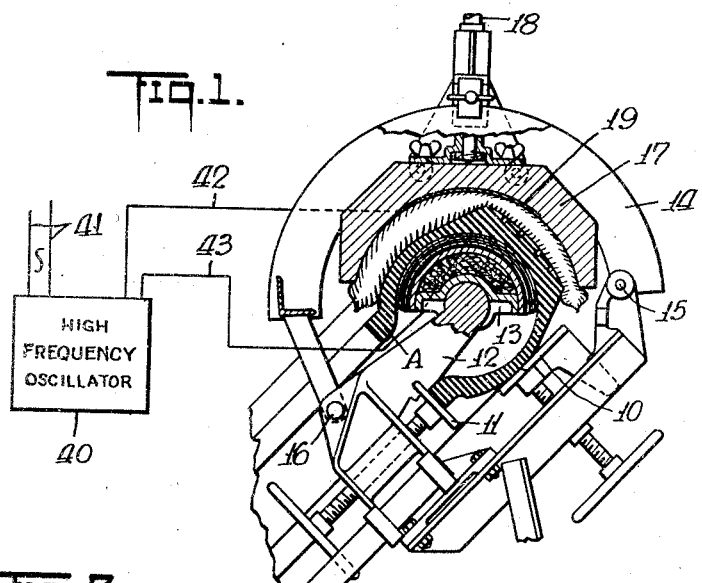
INVENTORS
Eino E. Lakso
Austin S. Chandler
BY
Dean Fairbank & Hirsch
ATTORNEYS May 27, 1947.　　　E. E. LAKSO ET AL　　　2,421,102
REPAIR OF TIRES
Filed Nov. 9, 1944　　　2 Sheets-Sheet 2
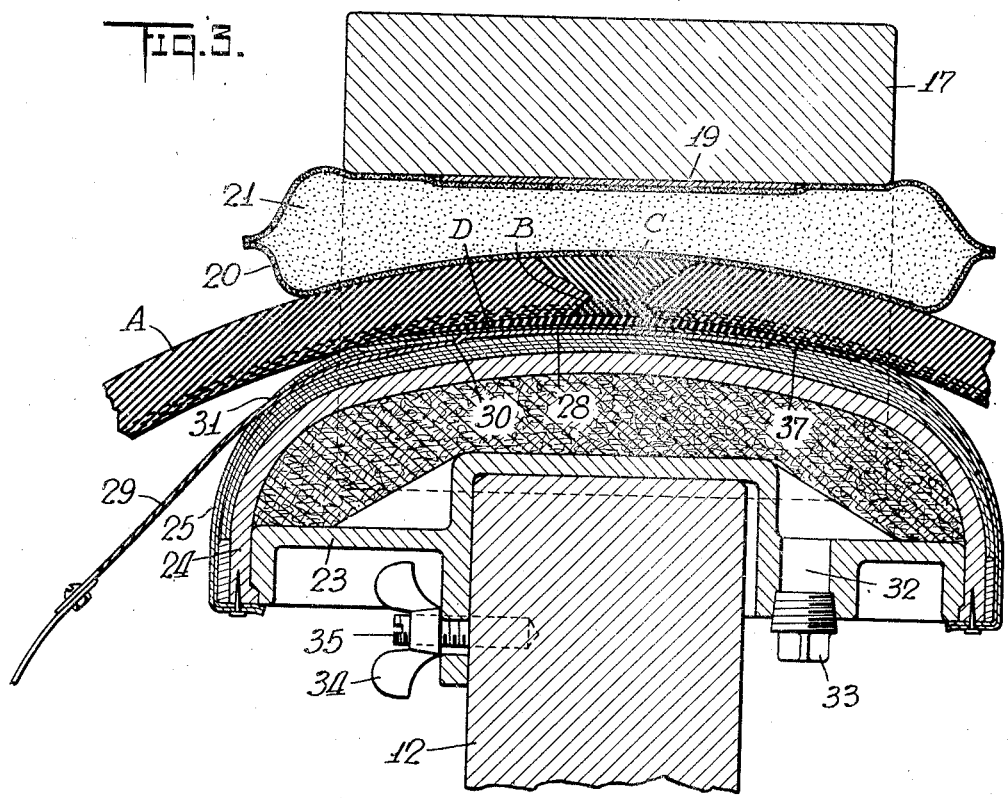
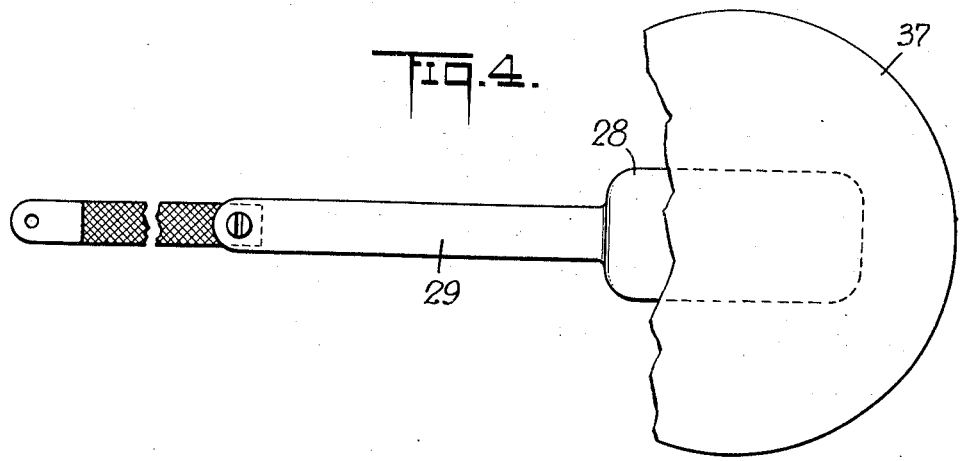
INVENTORS
Eino E. Lakso
Austin S. Chandler
BY
Dean Fairbank & Hirsch
ATTORNEYS Patented May 27, 1947

2,421,102

UNITED STATES PATENT OFFICE 2,421,102

REPAIR OF TIRES

Eino E. Lakso and Austin S. Chandler, Fitchburg, Mass., assignors to Clarence W. Vogt, Norwalk, Conn.

Application November 9, 1944, Serial No. 562,653

6 Claims. (Cl. 18—18)

This invention relates to the repair of tires by the vulcanizing of uncured rubber which has been applied to the area requiring repair, and in which the vulcanizing is effected by the use of a high frequency electrostatic field.

The invention is an improvement on the apparatus illustrated and shown in the application of Eino E. Lakso, Serial No. 528,396, filed March 28, 1944, and relates particularly to the construction of the electrode plate used within the tire and the support therefor, whereby pressure is applied to the tire wall over the area being vulcanized.

The main object of the invention is to provide a support for the electrode plate which will form an attached part of the apparatus, which is deformable under pressure to effect a uniform distribution of pressure, and is not adversely affected by the temperature changes to which the apparatus may be subjected.

As one feature of the invention the support for the inner electrode comprises a pad having a rigid base which may be detachably mounted in the apparatus, and which has a flexible upper wall for supporting the electrode, the space between the flexible wall and the base being filled with a plastic material. By means of this electrode support the flexible wall may adapt itself to the inner surface of the tire over an area far greater than that of the particular area being repaired, and uniform pressure may be applied without distorting or bending the tire wall to any substantial extent.

As a further feature an electrode plate, contactor or support is attached to and carried by the aforesaid flexible wall for engagement with a flexible electrode plate, so that the proper positioning of the electrode plate in respect to the area being repaired may be effected, and regardless of any lack of accurate registration of the support and said area.

As a further feature the electrode plate is a thin metal foil which may be temporarily and detachably applied to the inner surface of the tire wall in proper position in respect to the area to be repaired, and will engage the electrode plate, contactor or support during vulcanizing operation.

In the accompanying drawings there is illustrated one embodiment of our invention, but it will be understood that various changes in detail, design, relative proportions, etc., may be made without departing from the spirit or scope of our invention.

In the drawings:

Fig. 1 is a section through a portion of an apparatus embodying the invention, and illustrating a tire in operative position between the electrode plates.

Fig. 2 is a section similar to a portion of Fig. 1, but on a larger scale.

Fig. 3 is a section on the line 3—3 of Fig. 2, and

Fig. 4 is a plan view of the electrode plate, its contactor, and electric connection of the latter, separate from the other parts.

Our apparatus is intended primarily for the repair of tires in which there is a hole through the tire wall A which has to be plugged. The hole is reamed out and injured portions of the rubber cut away, so that the opposite ends of the hole flare outwardly and inwardly. The inner end of the hole is filled with cushion gum B, and the outer end filled with tread gum C, and pressed and worked into place so as to restore the inner and outer surfaces of the tire wall to substantially the original contour. The usual patch D is applied to the inner surface of the tire, said patch being of very substantially larger area than the area of the hole, and the patch usually includes one or more layers of canvas or other fabric. Such patches are of the kind commonly employed in making repairs of the type above referred to.

In the apparatus as shown in Fig. 1, the tire A is placed in the apparatus in an inclined position, and engages a pair of tire supports 10 and 11, one engaging the side of the tire wall and the other the edge of the bead. These tire supports are adjustable so as to bring the portion of the tire wall to be repaired into proper position in respect to the electrode plates. An arm 12 projects inwardly between the beads to support the inner electrode carrier 13, and a curved track 14 is pivotally mounted at the point 15 and detachably secured to the frame at the point 16. This track is concentric with the point of pivotal support for the inner electrode carrier, so that the outer electrode carrier 17 may be moved along the track and along the tire wall. The outer electrode carrier 17 may be forced inwardly toward and from the tire by an operating screw 18, and on its inner curved surface it carries a curved electrode plate 19.

As the outer surface of a tire may vary widely, depending upon the nature and character of the tread, there is employed a deformable layer of dielectric material between the electrode and the tire, so that when the outer electrode and its carrier are pressed downwardly, a uniform pressure is applied to the outer surface of the tire. This is shown as a deformable bag 20, which may contain pulverulent or granular dielectric material 21, such as beach sand. The wall of the bag may be formed of canvas or any other suitable material.

To the extent above described the parts may be substantially the same as shown in application Serial No. 528,396, above referred to.

As an important feature of the invention the inner electrode carrier is formed with a rigid base 23 and a flexible upper or outer wall. This wall, as illustrated, includes an inner layer 24 which is flexible, imperforate, and substantially non-stretchable. It may be formed of two or more layers of canvas impregnated with rubber and vulcanized. There is also an outer layer 25 which may be formed of glass cloth, and between these layers there are preferably additional layers 26, also of glass cloth. These may extend over substantially the entire width of the inner layer 24, as shown in Fig. 2, but the successive intermediate layers may be of different lengths, the outer one being the shortest, as shown in Fig. 3. Between this flexible wall and the base 23 there is a filling 27 of a non-hardening, non-compressible plastic material. This may be of asbestos fibers intermixed with a semi-fluid material which does not change its consistency or character to any substantial extent through a wide range of temperature, and does not adversely affect the base 23 or wall layer 24. The flexibility of the wall may be varied by varying the pressure employed in filling the chamber between this wall and the base 23. As shown, the base has a filling opening 32 through which the plastic material may be forced in, and this may be closed by a suitable plug 33.

For forming electric connection to the inner electrode, the wall or layer 25 carries a plate or electrode contactor 28, which may be of thin copper, and which has an extension or strap part 29, as shown in Fig. 4, so that it may be connected to one terminal of the electric heating circuit. The body portion of the electrode contactor lies directly upon the outer layer 25, but said layer preferably has two slots 30 and 31 formed therein, so that the extension or strap part 29 may be projected through the slot 30 to the inner surface of the layer 25, and then out through the slot 31. Thus the electrode contactor and its extension may be semi-permanently attached to the flexible wall which presses the electrode against the tire. The base 23 is mounted on a substantially cylindrical terminal portion of the arm 12, and may be angularly adjusted so that the electrode contactor will be vertically disposed over the terminal portion of the arm, as shown in the drawings, or may be moved angularly clockwise to a considerable extent. Thus the electrode contactor may be brought to proper position in respect to the tire area to be vulcanized. It may be clamped in place by a wing nut 34 on a threaded stud 35 carried by the arm 12 and extending through a slot 36. It will of course be understood that the outer electrode carrier should be adjusted along its track 14, so that the two electrode plates will be directly opposite to each other and substantially parallel.

As the outer electrode plate 19 is mounted directly on the curved surface of the wooden block 17, this plate is not subject to any strains tending to bend or curve it, and it may be made comparatively wide, and very much wider than the portion of the tire which is to be vulcanized. The inner electrode contactor 28 is carried by a flexible wall, and therefore may be subject to bending strains during the clamping of the tire in position between the electrode plates. Therefore it is desirable to make the electrode contactor 28 comparatively small. In order to insure the development of the proper electrostatic field during the vulcanization, and over an area of the tire somewhat wider than that requiring vulcanization, there is provided an electrode plate 37 comprising a thin sheet of metal foil. This may be of aluminum or other metal. After the unvulcanized rubber has been packed in place in the hole of the tire which is to be repaired, and the patch D has been applied, the metal foil 37 is applied to the inner surface of the tire over the patch, and its edges may be temporarily and detachably held in place by small pieces of adhesive tape, or in any other suitable manner. When the tire is clamped between the electrode plate 19 and the flexible wall 25, the metal foil 37 will lie directly on and in contact with the plate 28, and will lie substantially parallel to the electrode plate 19. Considered electrically, the parts 28 and 37 together may be considered the electrode plate.

The foil, being thin, will closely follow the surface of the tire wall when the latter is compressed, and the foil will of course bend as the outer flexible wall of the electrode support bends. After the repair job has been completed and the tire taken out, the foil may be removed from the inner surface of the tire and be ready for re-use.

As previously noted, the apparatus hereinbefore described is adapted and intended for use where the heating effect is produced by an electrostatic field. This field may be produced between the two electrode plates by the use of any suitable apparatus for generating a high frequency alternating current. In Fig. 1 there is shown diagrammatically a high frequency oscillator 40 having lead lines 41 for an alternating current, and connections 42 and 43 to the two electrode plates.

Having thus described our invention what we claim as new and desire to secure by Letters Patent is:

1. An apparatus for repairing a tire by vulcanizing a repair part in a high frequency electrostatic field, comprising a pair of substantially parallel inner and outer electrode plates for receiving the tire wall therebetween, the inner plate being of thin flexible metal foil an electrode carrier rigidly supporting the outer plate and maintaining it in predetermined shape and position independently of the shape of the tire, a deformable pad of dielectric material and of variable thickness for spacing said last mentioned electrode plate from the outer surface of the tire wall, and a second deformable pad for supporting the metal foil electrode plate and holding it closely adjacent to the inner surface of the tire wall.

2. An apparatus for repairing a tire by vulcanizing a repair part in a high frequency electrostatic field, comprising a pair of substantially parallel electrode plates for receiving the tire wall therebetween, one of said plates being of thin flexible sheet metal means for supporting the other of said electrode plates outside of the tire wall in predetermined shape and position irrespective of the shape of the tire, a pressure applying member of dielectric material adapted to be disposed between said latter electrode plate and the outside of the tire wall, and adapted to conformably engage the outside of the tire, and a deformable pad for supporting the thin flexible electrode and holding it closely adjacent to the inner surface of the tire wall.

3. An apparatus for repairing a tire by vulcanizing a repair part in a high frequency electrostatic field, said apparatus comprising a pair of substantially parallel electrode plates for receiving the tire wall therebetween, a pair of deformable pads, one of said plates being a thin metal foil, the other plate being of predetermined shape irrespective of the shape of the tire, one of said pads being of dielectric material and of variable thickness and being adapted to be positioned between one electrode plate and the outer surface of the tire and the other of said pads having the thin flexible metal foil electrode disposed between it and the inner surface of the tire.

4. An apparatus for repairing a tire, including a pair of curved substantially parallel electrode plates, a carrier having a rigid concave face carrying one of said plates, a pad of deformable dielectric material adapted to be positioned between said last mentioned plate and the outer surface of the tire wall, and a second carrier having a flexible wall, the other of said plates being of thin flexible metal foil and disposed thereon for direct contact with the inner surface of the tire wall.

5. An apparatus for repairing a tire by vulcanizing a repair part in a high frequency electrostatic field, comprising an electrode carrier adapted to be disposed on the outside of the tire to be repaired and having a surface of predetermined shape substantially parallel to the inner surface of the tire to be repaired, an electrode plate of predetermined shape independent of the shape of said tire disposed against said surface on said electrode carrier and curved substantially parallel to the inner surface of the tire to be repaired, a deformable pad of dielectric material adapted to be disposed between said electrode plate and the outside of said tire, with one surface in conforming engagement with the outside surface of said tire, and its opposite surface substantially parallel to said electrode plate, said pad being deformable in all directions to permit its shape and thickness to vary according to the shape of the region between said electrode plate and said outside tire surface, a flexible electrode plate and said outside tire surface, a flexible electrode plate, a member for supporting said flexible electrode plate in the interior of said tire and holding it closely adjacent to the inner surface of the tire wall in conforming engagement therewith, said plate supporting member presenting a surface in conforming contact with said flexible electrode plate and substantially parallel to said first-mentioned electrode plate, means for applying pressure to said repair part through said deformable pad and said plate supporting member, and means for applying a high frequency electrical potential to said electrode plates.

6. An apparatus for repairing a tire by vulcanizing a repair part in a high frequency electrostatic field, comprising an electrode carrier adapted to be disposed on the outside of the tire to be repaired and having a surface of predetermined shape substantially parallel to the inner surface of the tire to be repaired, an electrode plate of predetermined shape independent of the shape of said tire disposed against said surface and curved substantially parallel to the inner surface of the tire to be repaired, a deformable pad of dielectric material adapted to be disposed between said electrode plate and the outside of said tire with one surface in conforming engagement with the outside surface of said tire and its opposite surface substantially parallel to said electrode plate, said pad being deformable in all directions to permit its shape and thickness to vary according to the shape of the region between said electrode plate and said outside tire surface, an electrode plate support adapted to extend in the interior of the tire to be repaired, a flexible electrode plate adapted to extend in the interior of the tire and bent into conformity with the inner surface of said tire and in substantial parallelism with the first-mentioned electrode plate, a deformable pad between said flexible electrode plate and said electrode plate support, means for applying pressure to said tire repair part through said deformable pads, and means for applying a high frequency electric potential to said electrode plates.

EINO E. LAKSO.
AUSTIN S. CHANDLER.

REFERENCES CITED

The following references are of record in the file of this patent:

UNITED STATES PATENTS

| Number | Name | Date |
| --- | --- | --- |
| 1,828,265 | Walther | Oct. 20, 1931 |
| 1,903,025 | Browne | Mar. 28, 1933 |
| 2,138,620 | Strange | Nov. 29, 1938 |
| 2,280,771 | Dufour et al. | Apr. 28, 1942 |
| 2,109,323 | Smith | Feb. 22, 1938 |
| 2,298,037 | Crandell | Oct. 6, 1942 |